United States Patent
Kawamura

(10) Patent No.: US 11,667,268 B2
(45) Date of Patent: Jun. 6, 2023

(54) VEHICLE CLEANER SYSTEM AND VEHICLE SYSTEM

(71) Applicant: KOITO MANUFACTURING CO., LTD., Tokyo (JP)

(72) Inventor: Kazuki Kawamura, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 185 days.

(21) Appl. No.: 16/979,360

(22) PCT Filed: Mar. 4, 2019

(86) PCT No.: PCT/JP2019/008283
§ 371 (c)(1),
(2) Date: Sep. 9, 2020

(87) PCT Pub. No.: WO2019/176607
PCT Pub. Date: Sep. 19, 2019

(65) Prior Publication Data
US 2021/0001819 A1    Jan. 7, 2021

(30) Foreign Application Priority Data
Mar. 12, 2018 (JP) .............................. JP2018-043998

(51) Int. Cl.
*B60S 1/56* (2006.01)
*B60S 1/54* (2006.01)
*B60S 1/48* (2006.01)

(52) U.S. Cl.
CPC ............. *B60S 1/56* (2013.01); *B60S 1/481* (2013.01); *B60S 1/54* (2013.01)

(58) Field of Classification Search
None
See application file for complete search history.

(56) References Cited

U.S. PATENT DOCUMENTS

2004/0165749 A1* 8/2004 Holz ..................... G06V 20/56
                                                382/104
2009/0250533 A1* 10/2009 Akiyama ................ B60S 1/381
                                                239/284.1

(Continued)

FOREIGN PATENT DOCUMENTS

CN         106240526 A  * 12/2016
CN         107323379 A  * 11/2017

(Continued)

OTHER PUBLICATIONS

International Search Report dated Apr. 2, 2019 (PCT/ISA/210) issued by the International Searching Authority for International Application No. PCT/JP2019/008283.

(Continued)

*Primary Examiner* — Spencer E. Bell
*Assistant Examiner* — Omair Chaudhri
(74) *Attorney, Agent, or Firm* — Sughrue Mion, PLLC

(57) ABSTRACT

A vehicle cleaner system includes: a cleaner unit configured to be mounted on a vehicle and to discharge a cleaning medium to an external sensor that acquires information outside the vehicle so as to clean the external sensor; and a cleaner control unit configured to control the cleaner unit. The cleaner control unit is configured to acquire weather information, and control the cleaner unit such that at least one of a type of the cleaning medium, a discharge amount of the cleaning medium, the number of times of discharge of the cleaning medium, the number of times of discharge of the cleaning medium per unit time, and a discharge time of the cleaning medium varies according to the weather information.

6 Claims, 6 Drawing Sheets

(56) References Cited

U.S. PATENT DOCUMENTS

| | | | |
|---|---|---|---|
| 2010/0101040 A1* | 4/2010 | Debrouwere | B60S 1/08 |
| | | | 318/638 |
| 2013/0092758 A1 | 4/2013 | Tanaka et al. | |
| 2014/0104426 A1* | 4/2014 | Boegel | B60R 1/10 |
| | | | 348/148 |
| 2015/0203077 A1* | 7/2015 | Gokan | H04N 5/2252 |
| | | | 134/102.2 |
| 2016/0272165 A1* | 9/2016 | Hsiao | B60S 1/54 |
| 2017/0259788 A1* | 9/2017 | Villa-Real | B60R 1/0602 |
| 2018/0170316 A1* | 6/2018 | Park | B60S 1/0833 |
| 2018/0339680 A1* | 11/2018 | Higuchi | B60R 11/04 |
| 2019/0009752 A1* | 1/2019 | Rice | B60S 1/56 |
| 2019/0106085 A1* | 4/2019 | Bacchus | B60S 1/62 |
| 2019/0322245 A1* | 10/2019 | Kline | B60S 1/0848 |
| 2020/0189527 A1* | 6/2020 | Kusama | B60Q 1/1423 |
| 2020/0391702 A1* | 12/2020 | Yamauchi | B60S 1/56 |
| 2021/0197769 A1* | 7/2021 | Shirakura | B60S 1/56 |
| 2021/0253066 A1* | 8/2021 | Shirakura | B60S 1/583 |

FOREIGN PATENT DOCUMENTS

| | | |
|---|---|---|
| JP | 61-150854 A | 7/1986 |
| JP | 63-279953 A | 11/1988 |
| JP | 2009-190445 A | 8/2009 |
| JP | 2013-100077 A | 5/2013 |
| JP | 2016-78489 A | 5/2016 |
| JP | 2016-187990 A | 11/2016 |
| WO | 2014/010578 A1 | 1/2014 |

OTHER PUBLICATIONS

Written Opinion dated Apr. 2, 2019 (PCT/ISA/237) issued by the International Searching Authority for International Application No. PCT/JP2019/008283.

* cited by examiner

VEHICLE CLEANER SYSTEM AND VEHICLE SYSTEM

CROSS-REFERENCE TO RELATED APPLICATIONS

This application is a National Phase Entry of PCT International Application No. PCT/JP2019/008283, filed on Mar. 4, 2019, which claims priority to Japanese Patent Application No. 2018-043998 filed on Mar. 12, 2018, the contents of all of which are incorporated herein by reference in their entirety.

TECHNICAL FIELD

The present invention relates to a vehicle cleaner system and a vehicle system.

BACKGROUND ART

A vehicle cleaner that discharges a cleaning liquid to a sensor or the like mounted on a vehicle is known in Patent Document 1 and the like.

CITATION LIST

Patent Document

Patent Document 1: JP-A-2016-187990

SUMMARY OF INVENTION

Technical Problem

The type and the degree of contamination of dirt adhering to the on-vehicle sensor vary depending on the weather condition.

Therefore, an object of the present invention is to provide a vehicle cleaner system and a vehicle system capable of selecting a cleaning condition suitable for cleaning an external sensor with a cleaner unit according to the weather.

Solution to Problem

A vehicle cleaner system according to one aspect of the present invention is a vehicle cleaner system including:
a cleaner unit configured to be mounted on a vehicle and to discharge a cleaning medium to an external sensor that acquires information outside the vehicle so as to clean the external sensor; and
a cleaner control unit configured to control the cleaner unit,
in which the cleaner control unit is configured to
acquire weather information, and
control the cleaner unit such that at least one of a type of the cleaning medium, a discharge amount of the cleaning medium, the number of times of discharge of the cleaning medium, the number of times of discharge of the cleaning medium per unit time, and a discharge time of the cleaning medium varies according to the weather information.

A vehicle system according to one aspect of the present invention is a vehicle system including:
a vehicle control unit;
a cleaner unit configured to be mounted on a vehicle and to discharge a cleaning medium to an external sensor that acquires information outside the vehicle so as to clean the external sensor; and
a cleaner control unit configured to control the cleaner unit,
in which the cleaner control unit is configured to
acquire weather information, and
control the cleaner unit such that at least one of a type of the cleaning medium, a discharge amount of the cleaning medium, the number of times of discharge of the cleaning medium, the number of times of discharge of the cleaning medium per unit time, and a discharge time of the cleaning medium varies according to the weather information.

Advantageous Effects of Invention

According to one aspect of the present invention, it is possible to provide a vehicle cleaner system and a vehicle system capable of selecting a cleaning condition suitable for cleaning an external sensor with a cleaner unit according to the weather.

DESCRIPTION OF EMBODIMENTS

Figure 1:
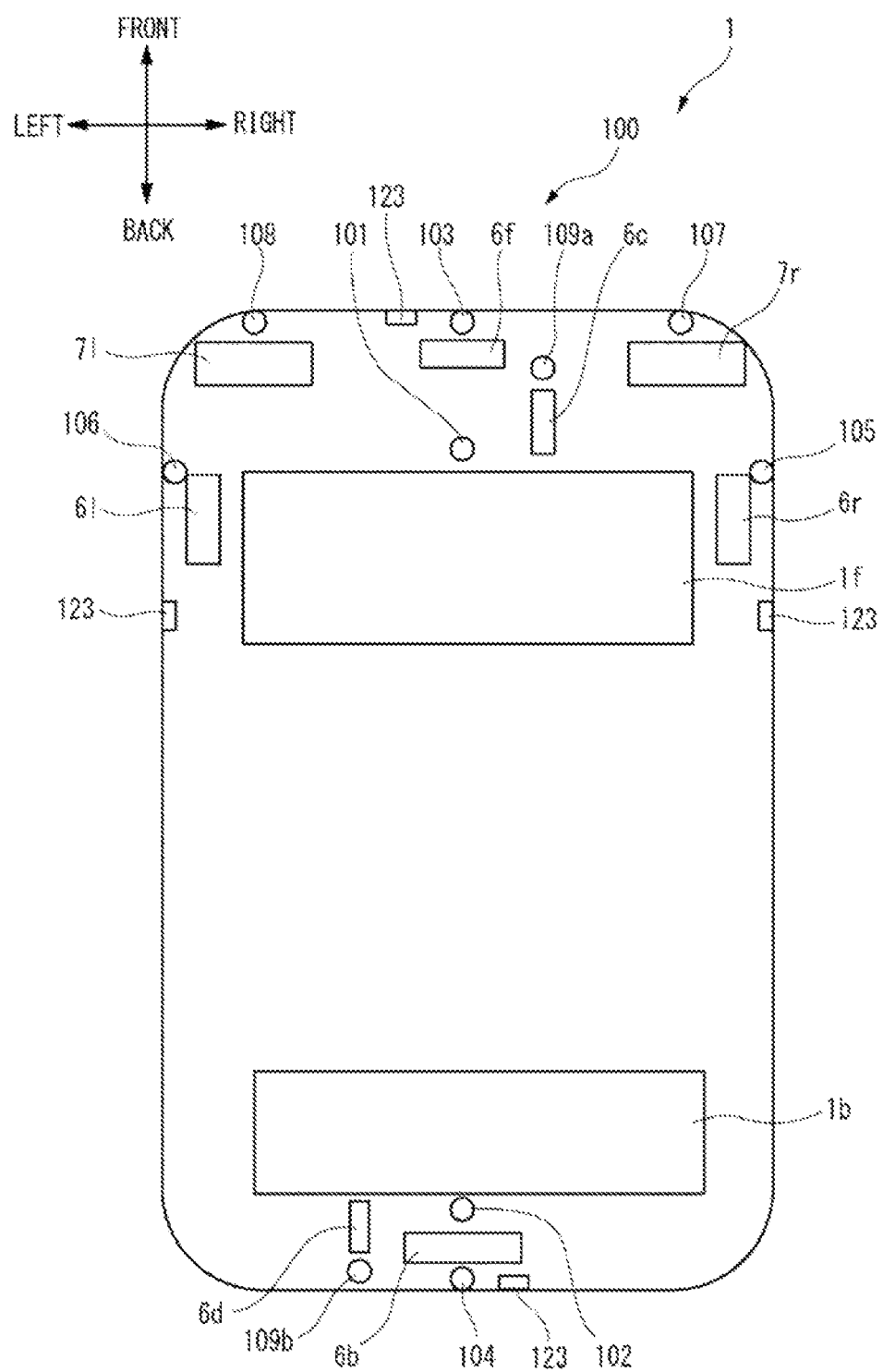
FIG. 1 is a top view of a vehicle mounted with a vehicle cleaner system according to the present invention.

Hereinafter, an embodiment of the present invention will be described with reference to the drawings. Incidentally, members having the same reference numbers as members that have been described in the description of the present embodiment will be omitted for convenience of description. In addition, dimensions of members shown in the drawings may be different from actual dimensions thereof for convenience of description.

In the description of the present embodiment, "left-right direction", "front-rear direction", and "upper-lower direction" are appropriately referred to, for convenience of description. These directions are relative directions set for a vehicle 1 shown in FIG. 1. Here, the "upper-lower direction" is a direction including an "upper direction" and a "lower direction". The "front-rear direction" is a direction including a "front direction" and a "rear direction". The "left-right direction" is a direction including a "left direction" and a "right direction".

FIG. 1 is a top view of the vehicle 1 in which a vehicle cleaner system 100 (hereinafter, referred to as a cleaner system 100) according to the present embodiment is mounted. The vehicle 1 includes the cleaner system 100. In the present embodiment, the vehicle 1 is an automobile that can travel in an automatic driving mode.

Figure 2:
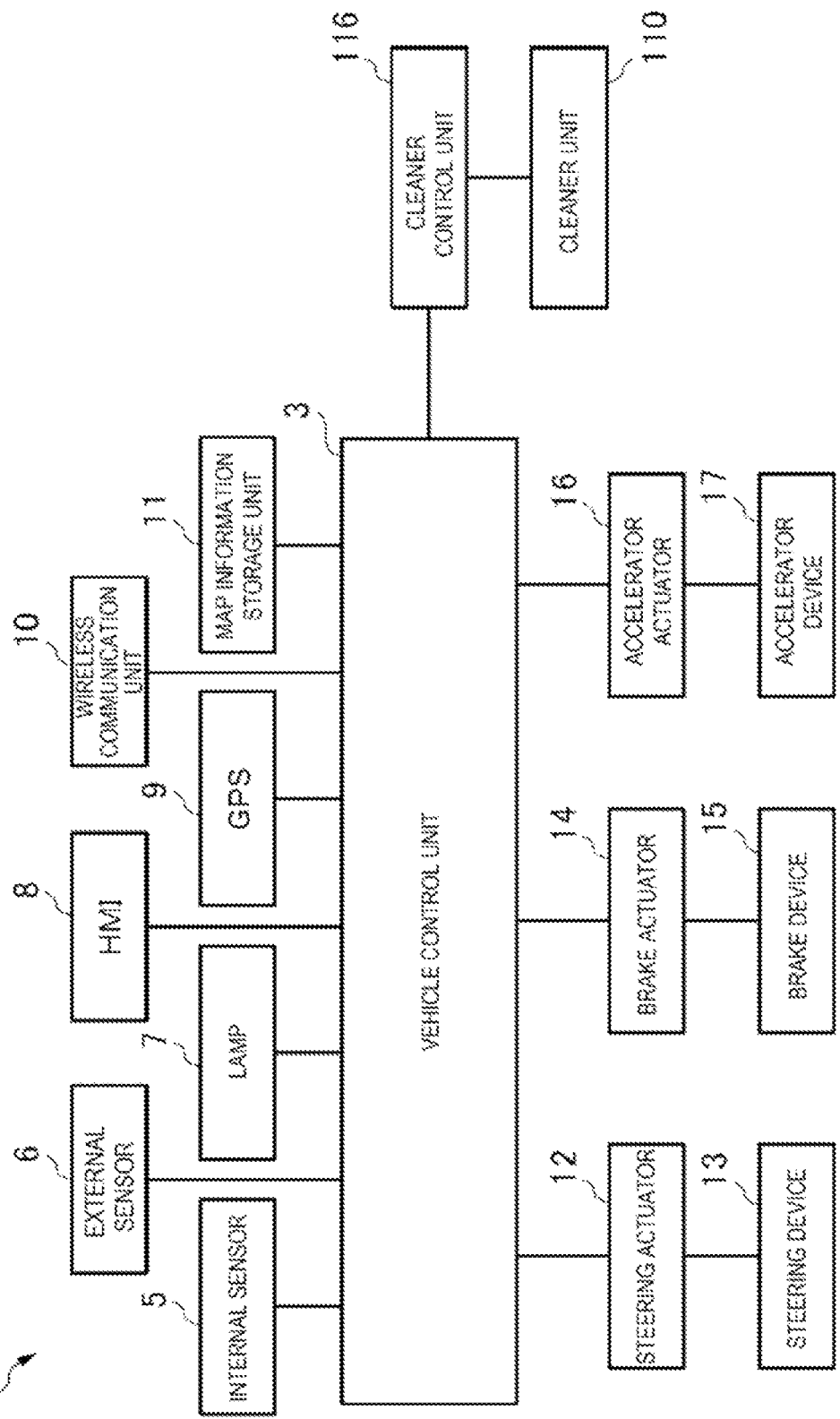
FIG. 2 is a block diagram of a vehicle system.

First, a vehicle system 2 of the vehicle 1 will be described with reference to FIG. 2. FIG. 2 shows a block diagram of the vehicle system 2. As shown in FIG. 2, the vehicle system 2 includes a vehicle control unit 3, an internal sensor 5, an external sensor 6, a lamp 7, a human machine interface (HMI) 8, a global positioning system (GPS) 9, a wireless communication unit 10, and a map information storage unit 11. The vehicle system 2 further includes a steering actuator 12, a steering device 13, a brake actuator 14, a brake device 15, an accelerator actuator 16, and an accelerator device 17.

The vehicle control unit 3 includes an electronic control unit (ECU). The vehicle control unit 3 includes a processor such as a central processing unit (CPU), a read only memory (ROM) in which various vehicle control programs are stored, and a random access memory (RAM) in which various vehicle control data is temporarily stored. The processor is configured to load a program designated from the various vehicle control programs stored in the ROM onto the RAM and execute various processes in cooperation with the RAM. The vehicle control unit 3 is configured to control traveling of the vehicle.

The lamp 7 is at least one of a headlamp or a position lamp provided at a front portion of the vehicle 1, a rear combination lamp provided at a rear portion of the vehicle 1, a turn signal lamp provided on the front portion or a side portion of the vehicle, various lamps for notifying a pedestrian and a driver of other vehicles of a status of a host vehicle, or the like.

The HMI 8 includes an input unit that receives an input operation from a user, and an output unit that outputs traveling information or the like to the user. The input unit includes a steering wheel, an accelerator pedal, a brake pedal, a driving mode switching switch that switches a driving mode of the vehicle 1, or the like. The output unit is a display that displays various traveling information.

The internal sensor 5 is a sensor capable of acquiring information of the host vehicle. The internal sensor 5 is, for example, at least one of an acceleration sensor, a speed sensor, a vehicle wheel speed sensor, a gyro sensor, or the like. The internal sensor 5 is configured to acquire information of the host vehicle including a traveling state of the vehicle 1 and output the information to the vehicle control unit 3.

The internal sensor 5 may include a sensor that detects a displacement of the HMI 8, a seating sensor that detects whether the user is sitting on a seat, a face orientation sensor that detects a direction of a face of the user, a human detection sensor that detects whether or not there is a person in the vehicle, or the like.

The external sensor 6 is a sensor capable of acquiring information on outside of the host vehicle. The external sensor is, for example, at least one of a camera, a radar, a LiDAR, the GPS 9, the wireless communication unit 10, or the like. The external sensor 6 is configured to acquire information on the outside of the host vehicle including a surrounding environment of the vehicle 1 (another vehicle, a pedestrian, a road shape, a traffic sign, an obstacle, or the like) and output the information to the vehicle control unit 3. Alternatively, the external sensor 6 may include a weather sensor that detects a weather condition, an illuminance sensor that detects an illuminance of the surrounding environment of the vehicle 1, or the like. The camera is, for example, a camera including an image pickup element such as a charge-coupled device (CCD) or a complementary MOS (CMOS). The camera is a camera that detects visible light or an infrared camera that detects infrared rays. The radar is, for example, a millimeter-wave radar, a microwave radar, or a laser radar.

The LiDAR is an abbreviation for light detection and ranging or laser imaging detection and ranging. The LiDAR is a sensor that generally emits non-visible light forward and acquires information such as a distance to an object, a shape of the object, a material of the object, a color of the object, or the like based on the emitted light and return light.

The GPS 9, which is a kind of the external sensor 6, is configured to acquire current position information of the vehicle 1 by measuring distances of a plurality of artificial satellites with respect to the host vehicle 1, and output the acquired current position information to the vehicle control unit 3. The wireless communication unit 10, which is a kind of the external sensor 6, is configured to receive traveling information of another vehicle around the vehicle 1 from the other vehicle and transmit the traveling information of the vehicle 1 to the other vehicle (inter-vehicle communication). In addition, the wireless communication unit 10 is configured to receive infrastructure information from infrastructure equipment such as a traffic light or a sign lamp and transmit the traveling information of the vehicle 1 to the infrastructure equipment (road-to-vehicle communication). The map information storage unit 11 is an external storage device such as a hard disk drive in which map information is stored, and is configured to output the map information to the vehicle control unit 3.

The vehicle control unit 3 is configured to receive an output of the internal sensor 5 that detects a displacement of an operator operated by a user such as the steering wheel, the accelerator pedal, and the brake pedal, an output of the internal sensor 5 that detects a state of the vehicle, such as the vehicle speed sensor, the vehicle wheel speed sensor, the acceleration sensor, and a yaw rate sensor, and an output of the external sensor 6 that acquires the information on the outside of the vehicle 1. The vehicle control unit 3 is configured to generate a steering control signal, an accelerator control signal, and a brake control signal based on these outputs, and control these signals as necessary.

The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal.

The vehicle 1 can travel in the automatic driving mode and a manual driving mode. The vehicle control unit 3 can selectively execute the automatic driving mode and the manual driving mode.

In the automatic driving mode, the vehicle control unit 3 automatically generates the steering control signal, the accelerator control signal, and the brake control signal in accordance with the output of the external sensor 6 that acquires the information on the outside of the vehicle 1. The vehicle control unit 3 automatically generates the steering control signal, the accelerator control signal, and the brake control signal in accordance with the output of the external sensor 6, regardless of the output of the internal sensor 5 that detects the displacement of the operator that can be operated by the user. For example, in the automatic driving mode, the vehicle control unit 3 automatically generates the steering control signal, the accelerator control signal, and the brake control signal based on surrounding environment information in front of the vehicle 1 acquired by a front camera 6c, the current position information of the GPS 9, the map information stored in the map information storage unit 11, or the like. In the automatic driving mode, the vehicle 1 is driven independently of the user.

In the manual driving mode, the vehicle control unit 3 normally generates the steering control signal, the accelerator control signal, and the brake control signal regardless of the output of the external sensor 6. That is, in the manual driving mode, the vehicle control unit 3 generates the steering control signal based on the operation of the steering wheel of the user, regardless of the output of the external sensor 6. The vehicle control unit 3 normally generates the accelerator control signal based on the operation of the accelerator pedal of the user, regardless of the output of the external sensor 6. The vehicle control unit 3 generates the brake control signal based on the operation of the brake pedal of the user, regardless of the output of the external sensor 6. In the manual driving mode, the vehicle 1 is normally driven by the user.

In the manual driving mode, the vehicle control unit 3 may execute an anti-lock brake control for controlling the brake control signal in accordance with the output of the vehicle wheel speed sensor, which is the internal sensor 5, for example. In the manual driving mode, the vehicle control unit 3 may execute a skid prevention control (electric stability control), a traction control, or the like, which controls at least one of the steering control signal, the accelerator control signal, and the brake control signal in accordance with the output of a steering angle sensor, the vehicle wheel speed sensor, and the yaw rate sensor that are the internal sensors 5. Alternatively, in the manual driving mode, the vehicle control unit 3 may execute a pre-crash control and a collision avoidance control for generating the steering control signal and the brake control signal in accordance with the output of the external sensor 6 such as the front camera 6c in an emergency. In this manner, in the manual driving mode, the vehicle control unit 3 may generate at least one of the steering control signal, the accelerator control signal, and the brake control signal in accordance with the output of the external sensor 6 in an emergency.

In the manual driving mode, a trigger for generating the steering control signal, the accelerator control signal, and the brake control signal is normally a displacement of an operator such as the steering wheel, the accelerator pedal, and the brake pedal operated by the user. In the manual driving mode, the vehicle control unit 3 may normally control a signal such as the steering control signal, the accelerator control signal, and the brake control signal generated by the displacement of the operator in accordance with the output of the internal sensor 5 or the external sensor 6. In the present embodiment, a so-called assist driving mode that assists the driving of the user in accordance with the output of the internal sensor 5 or the external sensor 6 is one form of the manual driving mode.

According to the definitions of levels 0 to 5 of the automatic driving mode currently known as of 2018, the automatic driving mode of the present embodiment corresponds to levels 3 to 5 (except for an emergency or the like), and the manual driving mode of the present embodiment corresponds to levels 0 to 2.

Referring back to FIG. 1, the vehicle 1 includes, as the external sensor 6, a front LiDAR 6f, a rear LiDAR 6b, a right LiDAR 6r, a left LiDAR 6l, the front camera 6c, and a rear camera 6d. The front LiDAR 6f is configured to acquire information on a front side of the vehicle 1. The rear LiDAR 6b is configured to acquire information on a rear side of the vehicle 1. The right LiDAR 6r is configured to acquire information on a right side of the vehicle 1. The left LiDAR 6l is configured to acquire information on a left side of the vehicle 1. The front camera 6c is configured to acquire information on the front side of the vehicle 1. The rear camera 6d is configured to acquire information on the rear side of the vehicle 1.

In the example shown in FIG. 1, the front LiDAR 6f is provided on a front portion of the vehicle 1, the rear LiDAR 6b is provided on a rear portion of the vehicle 1, the right LiDAR 6r is provided on a right portion of the vehicle 1, and the left LiDAR 6l is provided on a left portion of the vehicle 1, but the present invention is not limited to this example. For example, the front LiDAR, the rear LiDAR, the right LiDAR, and the left LiDAR may be collectively arranged on a ceiling portion of the vehicle 1.

The vehicle 1 includes a right headlamp 7r and a left headlamp 7l as the lamp 7. The right headlamp 7r is provided on a right portion of the front portion of the vehicle 1, and the left headlamp 7l is provided on a left portion of the front portion of the vehicle 1. The right headlamp 7r is provided on a right side of the left headlamp 7l.

The vehicle 1 includes a front window 1f and a rear window 1b.

The vehicle 1 includes the cleaner system 100 according to the embodiment of the present invention. The cleaner system 100 is a system that removes foreign matters such as a water droplet, mud, dust, or the like adhering to an object to be cleaned using a cleaning medium. In the present embodiment, the cleaner system 100 includes a front window washer (hereinafter, referred to as a front WW) 101, a rear window washer (hereinafter, referred to as a rear WW) 102, a front LiDAR cleaner (hereinafter referred to as a front LC) 103, and a rear LiDAR cleaner (hereinafter, referred to as a rear LC) 104, a right LiDAR cleaner (hereinafter referred to as a right LC) 105, a left LiDAR cleaner (hereinafter, referred to as a left LC) 106, a right headlamp cleaner (hereinafter referred to as a right HC) 107, a left headlamp cleaner (hereinafter referred to as a left HC) 108, a front camera cleaner 109a, and a rear camera cleaner 109b. Each of the cleaners 101 to 109b includes one or more nozzles, and discharges the cleaning medium such as a cleaning liquid or air from the nozzle toward the object to be cleaned. Incidentally, each of the cleaners 101 to 109b may be referred to as a cleaner unit 110.

The front WW 101 can clean the front window 1f. The rear WW 102 can clean the rear window 1b. The front LC 103 can clean the front LiDAR 6f. The rear LC 104 can clean the rear LiDAR 6b. The right LC 105 can clean the right LiDAR 6r. The left LC 106 can clean the left LiDAR 6l. The right HC 107 can clean the right headlamp 7r. The left HC 108 can clean the left headlamp 7l. The front camera cleaner 109a can clean the front camera 6c. The rear camera cleaner 109b can clean the rear camera 6d.

Figure 3:
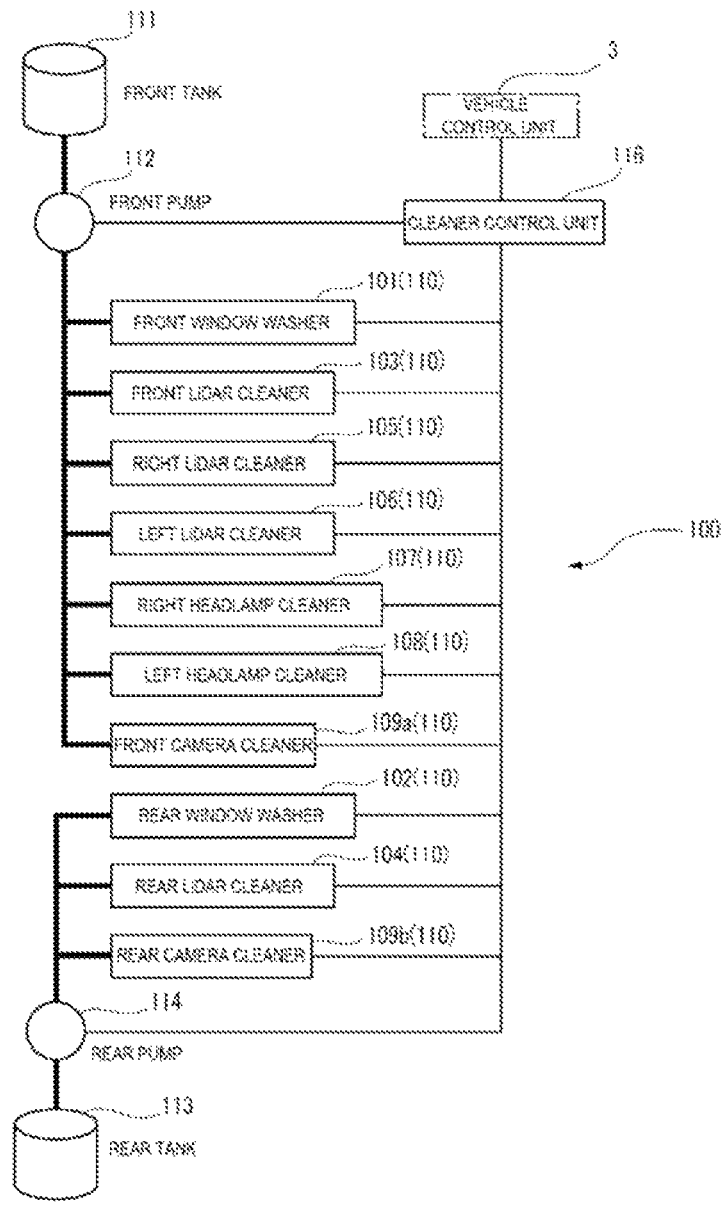
FIG. 3 is a schematic view of the vehicle cleaner system.

FIG. 3 is a schematic view of the cleaner system 100. The cleaner system 100 includes, in addition to the cleaner units 101 to 109b, a front tank 111, a front pump 112, a rear tank 113, a rear pump 114, and a cleaner control unit 116 (control unit).

The front WW 101, the front LC 103, the right LC 105, the left LC 106, the right HC 107, the left HC 108, and the front camera cleaner 109a are connected to the front tank 111 via the front pump 112. The front pump 112 sends the cleaning liquid stored in the front tank 111 to the front WW 101, the font LC 103, the right LC 105, the left LC 106, the right HC 107, the left HC 108, and the front camera cleaner 109a.

The rear WW 102 and the rear LC 104 are connected to the rear tank 113 via the rear pump 114. The rear pump 114 sends the cleaning liquid stored in the rear tank 113 to the rear WW 102, the rear LC 104, and the rear camera cleaner 109b.

Each of the cleaners 101 to 109b is provided with an actuator that opens the nozzle to discharge the cleaning liquid to the object to be cleaned. The actuator provided in each of the cleaners 101 to 109h are electrically connected to the cleaner control unit 116. In addition, the cleaner control unit 116 is also electrically connected to the front pump 112, the rear pump 114, and the vehicle control unit 3.

Figure 4:
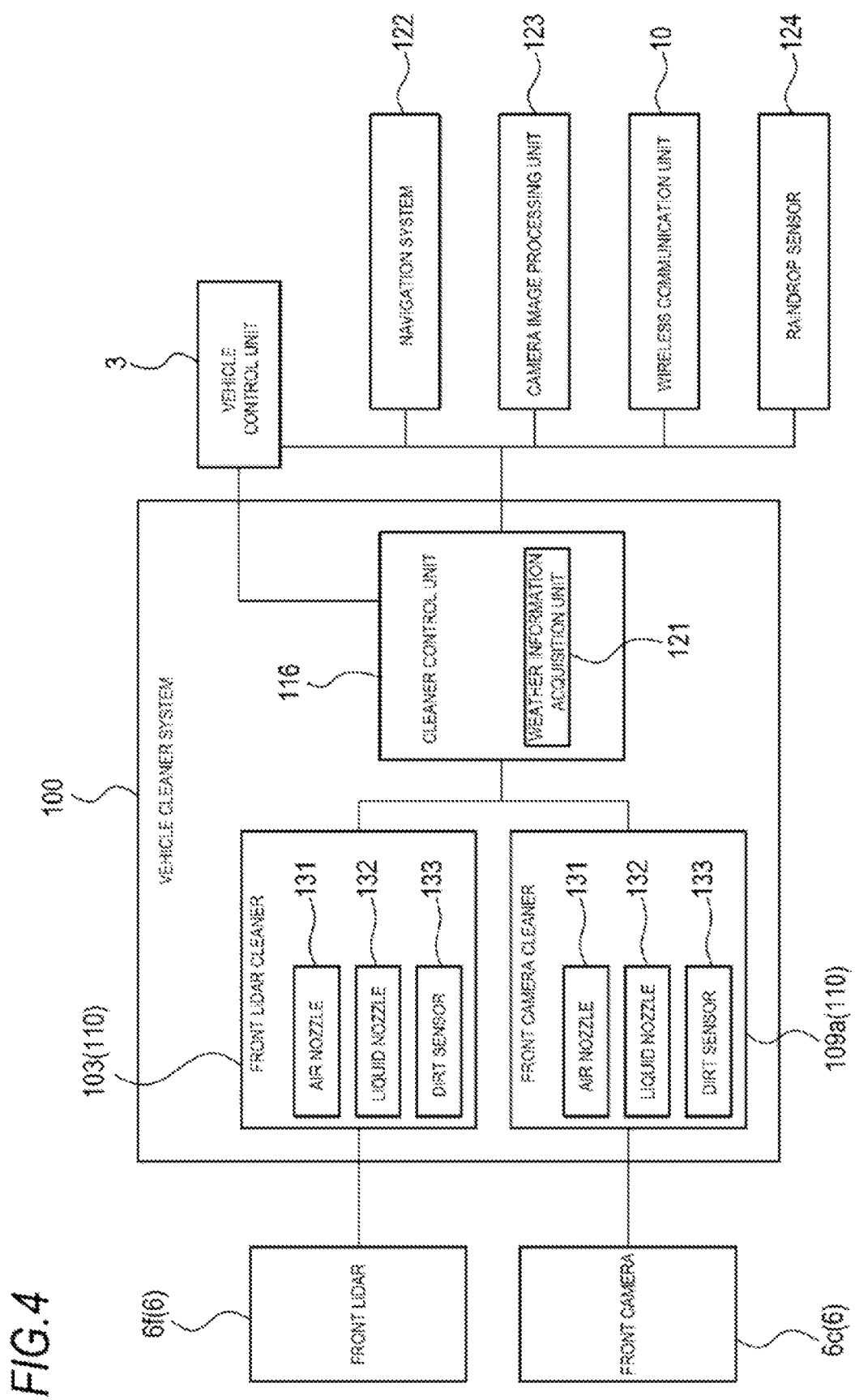
FIG. 4 is a block diagram of a main part of a vehicle cleaner system according to an embodiment of the present invention.

FIG. 4 is a block diagram of a main part of the vehicle cleaner system 100 according to an embodiment of the present invention. As shown in FIG. 4, the vehicle cleaner system 100 includes the cleaner units 110 that cleans the external sensors 6, and the cleaner control unit 116 that controls the operation of the cleaner units 110. Although only the front LC 103 and the front camera cleaner 109a are shown as the cleaner units 110 in FIG. 4, it is needless to say that the vehicle cleaner system 10 (includes the other cleaner units 110 as shown in FIG. 3.

The front LC 103 and the front camera cleaner 109a each have the air nozzle 131 that discharges air (for example, high-pressure air) as the cleaning medium to the external sensor 6, the liquid nozzle 132 that discharges the cleaning liquid as the cleaning medium to the external sensor 6, and the dirt sensor 133 that detects the dirt on the external sensor 6. Specifically, the front LC 103 includes the air nozzle 131 that discharges air as the cleaning medium to the front LiDAR 6f, the liquid nozzle 132 that discharges the cleaning liquid as the cleaning medium to the front LiDAR 6f, and the dirt sensor 133 that detects the dirt on the front LiDAR 6f. Similarly, the front camera cleaner 109a and the other cleaner units 110 also include the air nozzle 131, the liquid nozzle 132, and the dirt sensor 133.

The cleaner control unit 116 is connected to the front LC 103 and the front camera cleaner 109a, respectively. The cleaner control unit 116 is configured to control each cleaner unit 110. The cleaner control unit 116 is configured with, for example, at least one electronic control unit (ECU). The electronic control unit may include at least one microcontroller including one or more processors and one or more memories, and other electronic circuits including active elements such as transistors and passive elements. The processor is, for example, a central processing unit (CPU), a micro processing unit (MPU), and/or a graphics processing unit (GPU). The CPU may be configured with a plurality of CPU cores. The GPU may be configured with a plurality of GPU cores. The memory includes a read only memory (ROM) and a random access memory (RAM). A control program for the cleaner unit 110 may be stored in the ROM.

The processor may be configured to load a program designated from a program group stored in the ROM onto the RAM and execute various processes in cooperation with the RAM. In addition, the electronic control unit (ECU) may be configured with an integrated circuit (hardware resource) such as an application specific integrated circuit (ASIC) or a field-programmable gate array (FPGA). Further, the electronic control unit may be configured with a combination of at least one microcontroller and an integrated circuit.

The cleaner control unit 116 includes a weather information acquisition unit 121. The weather information acquisition unit 121 acquires weather information of a place where the vehicle 1 is traveling. The weather information acquisition unit 121 is connected to at least one of the wireless communication unit 10, a navigation system 122, a camera image processing unit 123, a raindrop sensor 124, or the like, and acquires the weather information.

In the present embodiment, the cleaner control unit 116 receives a detection signal (for example, a dirt signal) from the dirt sensor 133, determines whether the external sensor 6 is in a clean state, and causes the cleaner unit 110 to operate based on a predetermined condition when the external sensor 6 is not in the clean state.

Figure 5:
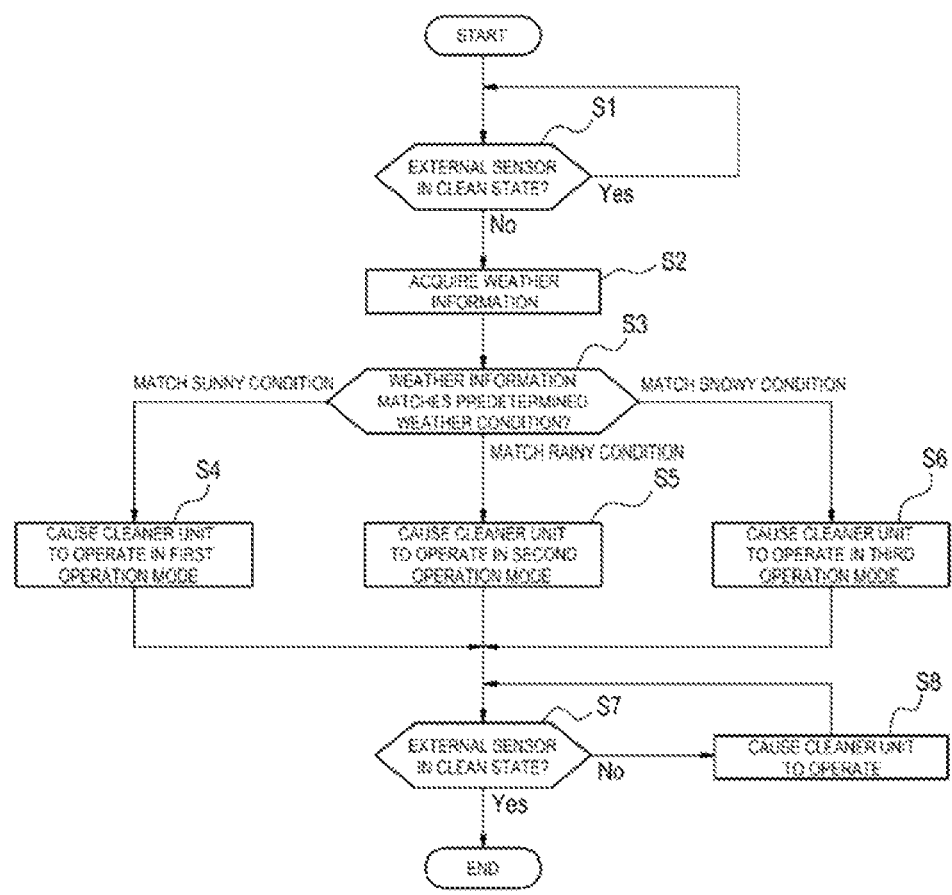
FIG. 5 is a flowchart executed by a vehicle cleaner system according to the embodiment of the present invention.

FIG. 5 is a flowchart showing an example of a process executed by the cleaner control unit 116. As shown in FIG. 5, in step S1, the cleaner control unit 116 determines whether or not the external sensor 6 is in the clean state based on the output of the dirt sensor 133. For example, the cleaner control unit 116 determines whether or not the front LiDAR 6f is in the clean state in accordance with the output of the dirt sensor 133 that detects the dirt of the front LiDAR 6f. Alternatively, the front LC 103 may be configured to transmit a signal notifying whether or not the front LiDAR 6f needs to be cleaned to the cleaner control unit 116 in accordance with the output of the dirt sensor 133, and the cleaner control unit 116 may be configured to determine whether or not the front LiDAR 6f is in the clean state in accordance with the signal of the front LC 103. Similarly to the front LC 103, the cleaner control unit 116 determines whether or not the external sensor 6 to be cleaned is in the clean state for the other cleaner units 110.

In a case where it is determined in step S1 that the external sensor 6 is in the clean state (Yes in step S1), the cleaner control unit 116 repeats the process of step S1 until it is determined that the external sensor 6 is not in the clean state.

On the other hand, in a case where it is determined in step S1 that the external sensor 6 is not in the clean state (No in step S1), in step S2, the cleaner control unit 116 acquires the weather information by the weather information acquisition unit 121 in step S2. The weather information includes, for example, weather information provided from the outside acquired by the wireless communication unit 10 or the navigation system 122, rain information indicating that rain is falling as the signal output from the raindrop sensor 124, or the like. In addition, the front camera 6c may be configured to capture the road surface state ahead of the vehicle and transmit the rain information indicating that rain is falling from the camera image processing unit 123 to the weather information acquisition unit 121 when the camera image processing unit 123 of the vehicle control unit 3 recognizes that rain is falling from the captured road surface state. Alternatively, the front camera 6c may be configured to transmit the rain information from the front camera 6c to the weather information acquisition unit 121 when the image processing unit of the front camera 6c recognizes that rain is falling. Further, when the vehicle control unit 3 receives a signal output in response to the operation of the wiper mounted on the vehicle 1, the vehicle control unit 3 may transmit the weather information (rain information) from the vehicle control unit 3 to the weather information acquisition unit 121.

In a case where rain is falling, there is a high possibility that dirt adheres to the external sensor 6 due to muddy water or the like splashed by a vehicle traveling ahead of the host vehicle. Alternatively, in a case where snow is falling, there is a high possibility that snow or ice adheres to the external sensor 6. As described above, the weather in which foreign matter such as dirt or snow is likely to adhere to the external sensor 6 is recorded in the memory as a predetermined weather condition.

In step S3, the cleaner control unit 116 reads the predetermined weather condition from the memory and collates it with the weather information to determine whether or not the acquired weather information matches the predetermined weather condition.

When it is determined that the acquired weather information matches a sunny (including cloudy) weather condition, in step S4, the cleaner control unit 116 causes the cleaner unit 110 to operate in a first operation mode. On the other hand, when it is determined that the acquired weather information matches a rainy weather condition, in step S5, the cleaner control unit 116 causes the cleaner unit 110 to operate in a second operation mode. Further, when it is determined that the acquired weather information matches a snowy weather condition, in step S6, the cleaner control unit 116 causes the cleaner unit 110 to operate in a third operation mode.

Figure 6A:
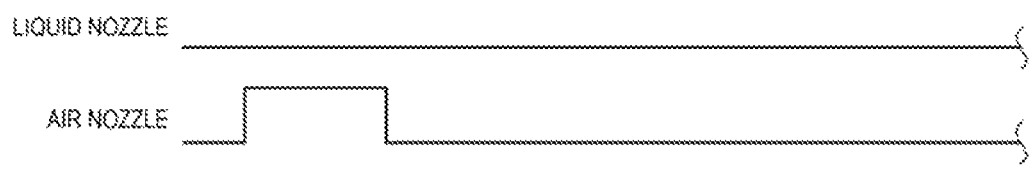
FIG. 6A shows a cleaning method in a first operation mode of a cleaner unit executed by the vehicle cleaner system according to the embodiment of the present invention.
Figure 6B:
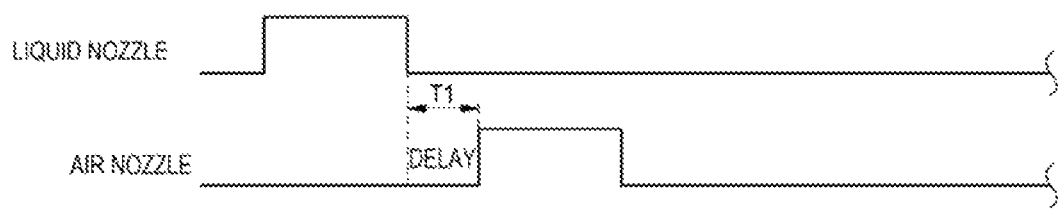
FIG. 6B shows a cleaning method in a second operation mode of a cleaner unit executed by the vehicle cleaner system.
Figure 6C:
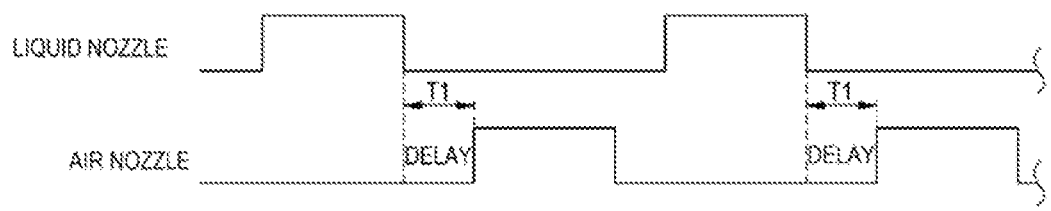
FIG. 6C shows a cleaning method in a third operation mode of a cleaner unit executed by the vehicle cleaner system.

FIG. 6A is a diagram illustrating the timing of discharging the cleaning liquid from the liquid nozzle 132 and the timing of discharging the air from the air nozzle 131 when the cleaner unit 110 is operated in the first operation mode. FIG. 6B is a diagram illustrating the timing of discharging the cleaning liquid from the liquid nozzle 132 and the timing of discharging the air from the air nozzle 131 when the cleaner unit 110 is operated in the second operation mode. FIG. 6C is a diagram illustrating the timing of discharging the cleaning liquid from the liquid nozzle 132 and the timing of discharging the air from the air nozzle 131 when the cleaner unit 110 is operated in the third operation mode.

As shown in FIG. 6A, in the first operation mode when the weather information meets the clear condition, the cleaner control unit 116 causes the cleaner unit 110 to discharge the air from the air nozzle 131 without discharging the cleaning liquid from the liquid nozzle 132. In the sunny case, the dirt adhering to the external sensor 6 is likely to be those that can be easily removed, such as dust. Therefore, in order to suppress consumption of the cleaning liquid, the cleaner control unit 116 preferably causes the cleaner unit 110 to operate in the first operation mode in order to remove the dirt adhering to the external sensor 6 only with the air.

As shown in FIG. 6B, in the second operation mode when the weather information meets the rainy condition, the cleaner control unit 116 causes the cleaner unit 110 to discharge the cleaning liquid from the liquid nozzle 132 toward the external sensor 6 and then discharge the air from the air nozzle 131 toward the external sensor 6. The cleaner control unit 116 discharges air (for example, high-pressure air) from the air nozzle 131 after a lapse of predetermined time T1 from a time point when the cleaning of the external sensor 6 with the cleaning liquid is completed. That is, the discharge of the air is performed with a delay of the time T1 from the time point when the cleaning of the external sensor 6 by the discharge of the cleaning liquid is completed. In a case where rain is falling, there is a high possibility that muddy water or the like splashed by a vehicle traveling ahead of the host vehicle adheres to the external sensor 6. Therefore, the cleaner control unit 116 preferably causes the cleaner unit 110 to operate in the second operation mode in order to clean the dirt or the like adhering to the external sensor 6 with the cleaning liquid and further blow off the cleaning liquid adhering to the external sensor 6 by the air.

As shown in FIG. 6C, in the third operation mode when the weather information meets the snowy condition, the cleaner control unit 116 causes the cleaner unit 110 to repeat a plurality of times the operation of discharging the cleaning liquid from the liquid nozzle 132 toward the external sensor 6 and then discharging the air from the air nozzle 131 toward the external sensor 6. In a case where snow is falling, there is a high possibility that a foreign matter that is difficult to remove, such as snow or ice, adheres to the external sensor 6. Therefore, the cleaner control unit 116 preferably causes the cleaner unit 110 to operate in the third operation mode in order to melt snow or the like adhering to the external sensor 6 by a plurality of times of discharge of the cleaning liquid and the air.

In step S4 to step S6, the cleaner control unit 116 may drive at least one of the cleaner units 110, or may operate all the cleaner units 110. In the first place, since the sensitivity of the external sensor 6 that acquires the external information in front is required when the automatic driving mode is executed, it is preferable to operate at least the front camera cleaner 109a for cleaning the front camera 6c that acquires the information on the front side of the vehicle and the front LC 103 for cleaning the front LiDAR 6f.

When any one of steps S4 to S6 is completed, in step S7, the cleaner control unit 116 determines whether or not the external sensor 6 is in the clean state based on the output of the dirt sensor 133. In a case where it is determined that the external sensor 6 is in the clean state (Yes in step S7), the cleaner control unit 116 ends the processing. On the other hand, in a case where it is determined that the external sensor 6 is not in the clean state (No in step S7), in step S8, the cleaner control unit 116 causes the cleaner unit 110 to operate again to clean the external sensor 6. In this case, the cleaner control unit 116 cause the cleaner unit 110 to operate in any one of the first operation mode to the third operation mode. For example, the cleaner control unit 116 may cause the cleaner unit 110 to operate by selecting one of the first operation mode to the third operation mode based on the weather information acquired in step S2. The cleaner control unit 116 causes the cleaner unit 110 to operate to clean the external sensor 6, and then returns the process to step S7.

As described above, according to the vehicle cleaner system 100 according to the present embodiment, the cleaner control unit 116 acquires the weather information by the weather information acquisition unit 121, and causes the cleaner unit 110 to operate such that the type of cleaning medium and the number of times of discharge of the cleaning medium are different according to the acquired weather information. Specifically, as described above, the cleaner control unit 116 causes the cleaner unit 110 to operate such that the type of the cleaning medium varies between the first operation mode, the second operation mode, and the third operation mode. Further, the cleaner control unit 116 causes the cleaner unit 110 to operate such that the numbers of times of discharge of the cleaning liquid and the air vary between the second operation mode and the third operation mode. According to this configuration, it is possible to select a cleaning condition suitable for cleaning the external sensor 6 by the cleaner unit 110 based on the weather information, and to prevent consumption of the cleaning unit 110 and consumption of the cleaning liquid while keeping the external sensor 6 in a clean state.

The change of the cleaning method between the operation modes is not limited to the type of the cleaning medium and the number of times of discharge. For example, the cleaner control unit 116 may cause the cleaner unit 110 to operate such that at least one of the discharge amount of the cleaning medium, the discharge amount per unit time of the cleaning medium, the number of times of discharge per unit time of the cleaning medium, and the discharge time of the cleaning medium varies between the operation modes.

Various Modifications

Although the embodiment of the present invention has been described above, it is needless to say that the technical scope of the present invention should not be limitedly interpreted by the description of the embodiment. It is to be understood by those skilled in the art that the embodiment is merely an example and various modifications can be made within the scope of the invention described in the claims. The technical scope of the present invention should be determined based on the scope of the invention described in claims and an equivalent scope thereof.

In the embodiments described above, the driving mode of the vehicle is described as including the driving modes of levels 0 to 5, but the driving mode of the vehicle should not be limited to these modes. The driving mode of the vehicle may include at least one of these modes. For example, only any one of the driving modes of the vehicle may be executable.

Further, a classification and a display form of the driving mode of the vehicle may be appropriately changed according to laws or regulations related to automated driving in each country. Similarly, definitions of the driving modes in the description of the present embodiments are merely examples and may be appropriately changed according to the laws or regulations related to the automated driving in each country.

Although the above embodiment describes an example in which the cleaner system 100 is mounted on a vehicle capable of automatic driving, the cleaner system 100 may be mounted on a vehicle not capable of automatic driving.

In the above embodiment, the cleaner control unit 116 varies the number of times of discharge of the cleaning liquid discharged from the liquid nozzle 132 in the first operation mode and the second operation mode, but is not limited to this example. For example, the cleaner control unit 116 may control the cleaner unit 110 such that at least one of the discharge amount of the cleaning liquid, the discharge amount per unit time of the cleaning liquid, the number of times of discharge per unit time of the cleaning liquid, and the discharge time of the cleaning liquid varies between the first operation mode and the second operation mode.

In the above embodiment, although the configuration in which the above-described cleaner system 100 includes the external sensor 6 has been described, the cleaner system 100 may be configured not to include the external sensor 6. In the first place, it is preferable that the cleaner system 100 is configured as an assembly including the external sensor 6 because positioning accuracy of the cleaners 103 to 106, 109a and 109b with respect to the external sensor 6 can be easily increased. In addition, since the external sensors 6 can also be incorporated together when the cleaner system 100 is mounted on the vehicle 1, the ease of assembly to the vehicle 1 is also enhanced.

In the above embodiment, as a cleaner for cleaning the external sensor 6, the cleaners 103 to 106 for cleaning the LiDARs 6f, 6b, 6r, and 6l, the cleaner 109a for cleaning the front camera 6c, and the cleaner 109b for cleaning the rear camera 6d have been described, but the present invention is not limited thereto. The cleaner system 100 may include a cleaner for cleaning a radar, or the like, instead of the sensor cleaners 103 to 106, 109a, and 109b, or may include the cleaner together with the sensor cleaners 103 to 106, 109a, and 109b.

Note that the external sensor 6 such as the LiDARs 6f, 6b, 6r, and 6l may have a detection surface and a cover that covers the detection surface. The cleaner for cleaning the external sensor 6 may be configured to clean the detection surface, or may be configured to clean the cover that covers the sensor.

The cleaning liquid discharged by the cleaner system 100 includes water or a detergent. The cleaning mediums to be discharged to the front and rear windows 1f, 1b, the headlamps 7r, 7l, the LiDARs 6f, 6b, 6r, 6l, and the cameras 6c, 6d may be different or may be the same.

Although the example in which the cleaners 101, 103, 105 to 109b are connected to the front tank 111 and the cleaners 102, 104 are connected to the rear tank 113 has been described in the above embodiment, the present invention is not limited thereto. The cleaners 101 to 109b may be connected to one tank. The cleaners 101 to 109b may also be connected to different tanks. Alternatively, the cleaners 101 to 109b may be connected to a common tank for each type of an object to be cleaned thereof. For example, the LCs 103 to 106 may be connected to a common first tank, and the HCs 107, 108 may be connected to a second tank different from the first tank. Alternatively, the cleaners 101 to 109b may be connected to a common tank for each arrangement position of the object to be cleaned thereof. For example, the front WW 101, the front LC 103, and the front camera cleaner 109a may be connected to a common front tank, the right LC 105 and the right HC 107 may be connected to a common right tank, the rear WW 102, the rear WW 104, and the rear camera cleaner 109b may be connected to a common rear tank, and the left LC 106 and the left HC 108 may be connected to a common left tank.

Although an example in which the cleaning medium is discharged from the cleaners 101 to 109b by operating the actuators provided in the cleaners 101 to 109b has been described in the above embodiment, the present invention is not limited thereto. Each of the cleaners 101 to 109b is provided with a normally closed valve, and a pump is operated so that a pressure between the tank and each of the cleaners 101 to 109b is always high. The cleaner control unit 116 may open the valves provided in the cleaners 101 to 109b to discharge the cleaning mediums from the cleaners 101 to 109b. Alternatively, each of the cleaners 101 to 109b may be connected to an individual pump, and the cleaner control unit 116 may control each pump individually to control the discharge of the cleaning mediums from the cleaners 101 to 109b. In this case, each of the cleaners 101 to 109b may be connected to different tanks, or may be connected to a common tank.

Each of the cleaners 101 to 109b is provided with one or more discharge holes for discharging the cleaning medium. Each of the cleaners 101 to 109b may be provided with one or more discharge holes for discharging the cleaning liquid and one or more discharge holes for discharging air.

Each of the cleaners 101 to 109b may be individually provided, or the plurality of the cleaners 101 to 109b may be formed as a unit. For example, the right LC 105 and the right HC 107 may be configured as a single unit. In contrast to an aspect in which the right headlamp 7r and the right LiDAR 6r are integrated, the right LC 105 and the right HC 107 may be configured as a single unit.

This application is based on Japanese Patent Application No. 2018-43998 filed on Mar. 12, 2018, the contents of which are incorporated herein by reference.

The invention claimed is:

1. A vehicle cleaner system comprising:
a cleaner unit configured to be mounted on a vehicle and to discharge a cleaning medium to an external sensor that acquires information outside the vehicle so as to clean the external sensor; and
a cleaner control unit configured to control the cleaner unit,
wherein the cleaner control unit is configured to
acquire weather information,
compare the weather information to predetermined weather conditions recorded in a memory and determine which of the predetermined weather conditions the weather information matches, and
control the cleaner unit such that at least one of a type of the cleaning medium, a discharge amount of the cleaning medium, the number of times of discharge of the cleaning medium, the number of times of discharge of the cleaning medium per unit time, and a discharge time of the cleaning medium varies according to the predetermined weather condition that matches the weather information;
wherein the cleaner unit comprises:
a liquid nozzle configured to discharge a cleaning liquid as the cleaning medium toward the external sensor; and
an air nozzle configured to discharge air as the cleaning medium toward the external sensor; and
wherein:
in a case where the cleaner control unit determines that the weather information matches a first weather condition corresponding to a clear condition, the cleaner control unit causes the air nozzle to discharge the air to clean the external sensor without causing the liquid nozzle to discharge the cleaning liquid,
in a case where the cleaner control unit determines that the weather information matches a second weather condition corresponding to a rainy condition, the cleaner control unit causes the liquid nozzle to discharge the cleaning liquid at a first frequency to clean the external sensor, and causes the air nozzle to discharge the air to clean the external sensor after discharging the cleaning liquid, and
in a case where the cleaner control unit determines that the weather information matches a third weather condition corresponding to a snowy condition, the cleaner control unit causes the liquid nozzle to discharge the cleaning liquid at a second frequency higher than the first frequency to clean the external sensor, and causes the air nozzle to discharge the air to clean the external sensor after discharging the cleaning liquid.

2. The vehicle cleaner system according to claim 1,
wherein the weather information is based on information provided from outside the vehicle.

3. The vehicle cleaner system according to claim 1,
wherein the external sensor includes a raindrop sensor, and
wherein the weather information is based on a signal output from the raindrop sensor.

4. The vehicle cleaner system according to claim 1,
wherein the external sensor includes a camera, and
wherein the weather information is based on an image acquired from the camera.

5. The vehicle cleaner system according to claim 1,
wherein the weather information is based on a signal output according to an operation of a wiper mounted on the vehicle.

6. A vehicle system comprising:
a vehicle control unit;
a cleaner unit configured to be mounted on a vehicle and to discharge a cleaning medium to an external sensor that acquires information outside the vehicle so as to clean the external sensor; and
a cleaner control unit configured to control the cleaner unit,
wherein the cleaner control unit is configured to
acquire weather information,
compare the weather information with predetermined weather conditions recorded in a memory and determine which of the predetermined weather conditions the weather information matches and
control the cleaner unit such that at least one of a type of the cleaning medium, a discharge amount of the cleaning medium, the number of times of discharge of the cleaning medium, the number of times of discharge of the cleaning medium per unit time, and a discharge time of the cleaning medium varies according to the predetermined weather condition that matches the weather information;
wherein the cleaner unit comprises:
a liquid nozzle configured to discharge a cleaning liquid as the cleaning medium toward the external sensor; and
an air nozzle configured to discharge air as the cleaning medium toward the external sensor; and
wherein:
in a case where the cleaner control unit determines that the weather information matches a first weather condition corresponding to a clear condition, the cleaner control unit causes the air nozzle to discharge the air to clean the external sensor without causing the liquid nozzle to discharge the cleaning liquid,
in a case where the cleaner control unit determines that the weather information matches a second weather condition corresponding to a rainy condition, the cleaner control unit causes the liquid nozzle to discharge the cleaning liquid at a first frequency to clean the external sensor, and causes the air nozzle to discharge the air to clean the external sensor after discharging the cleaning liquid, and
in a case where the cleaner control unit determines that the weather information matches a third weather condition corresponding to a snowy condition, the cleaner control unit causes the liquid nozzle to discharge the cleaning liquid at a second frequency higher than the first frequency to clean the external sensor, and causes the air nozzle to discharge the air to clean the external sensor after discharging the cleaning liquid.

* * * * *